(12) United States Patent
Kho et al.

(10) Patent No.: US 11,044,784 B2
(45) Date of Patent: Jun. 22, 2021

(54) METHOD AND DEVICE FOR PERFORMING COMMUNICATION

(71) Applicant: Samsung Electronics Co., Ltd., Suwon-si (KR)

(72) Inventors: Youngsung Kho, Suwon-si (KR); Kyuho Han, Suwon-si (KR); Joonseo Lee, Suwon-si (KR); Moonyoung Jeong, Suwon-si (KR); Giwon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/352,122

(22) Filed: Mar. 13, 2019

(65) Prior Publication Data

US 2019/0289664 A1    Sep. 19, 2019

(30) Foreign Application Priority Data

Mar. 13, 2018  (KR) .................. 10-2018-0029279

(51) Int. Cl.
*H04W 76/34*  (2018.01)
*H04W 76/32*  (2018.01)
*H04W 92/06*  (2009.01)

(52) U.S. Cl.
CPC .......... *H04W 76/34* (2018.02); *H04W 76/32* (2018.02); *H04W 92/06* (2013.01)

(58) Field of Classification Search
CPC .......... H04L 29/08576; H04L 65/1066; H04L 69/24; H04L 65/1006; H04L 29/12311; H04L 29/06095; H04L 69/16; H04L 61/2084; H04L 67/14; H04W 76/00
See application file for complete search history.

(56) References Cited

U.S. PATENT DOCUMENTS

| | | | |
|---|---|---|---|
| 9,661,030 B2* | 5/2017 | Bao | H04L 65/1069 |
| 10,299,107 B2* | 5/2019 | Kim | H04W 76/12 |
| 2003/0235184 A1* | 12/2003 | Dorenbosch | H04L 65/4038 370/352 |
| 2015/0334042 A1* | 11/2015 | Katayama | H04L 12/4641 455/452.2 |
| 2016/0037411 A1 | 2/2016 | Franklin et al. | |
| 2016/0105838 A1* | 4/2016 | Wang | H04W 40/04 370/329 |
| 2016/0227558 A1* | 8/2016 | Jain | H04W 48/18 |

(Continued)

*Primary Examiner* — Syed Ali
(74) *Attorney, Agent, or Firm* — Jefferson IP Law, LLP

(57) ABSTRACT

A method of a first terminal is provided. The method includes communicating with a first gateway by using a first internet protocol (IP) address allocated to the first terminal, according to a first IP session, in response to a distance between the first terminal and a second gateway being equal to or less than a predetermined threshold, establishing a second IP session with the second gateway while the first IP session is set in the first terminal, receiving, from a second terminal, a first IP session-release message about the first IP session via the second gateway by using a second IP address according to the second IP session, when data from the first terminal is received by the second terminal according to the first IP session, and in response to the first IP session-release message being received from the second gateway, releasing the first IP session with the first gateway.

10 Claims, 8 Drawing Sheets

(56) References Cited

U.S. PATENT DOCUMENTS

| | | | |
|---|---|---|---|
| 2017/0195930 A1* | 7/2017 | Tomici | H04W 36/14 |
| 2017/0332301 A1* | 11/2017 | Horn | H04W 76/15 |
| 2018/0077610 A1* | 3/2018 | Onishi | H04W 36/14 |
| 2018/0198867 A1* | 7/2018 | Dao | H04W 76/34 |
| 2018/0376445 A1* | 12/2018 | Yoon | H04W 8/20 |
| 2019/0182874 A1* | 6/2019 | Cho | H04W 8/26 |
| 2019/0268815 A1* | 8/2019 | Zhu | H04W 76/12 |
| 2020/0084829 A1* | 3/2020 | Tang | H04W 76/34 |
| 2020/0170071 A1* | 5/2020 | Mildh | H04W 80/08 |
| 2020/0252900 A1* | 8/2020 | Kim | H04W 76/12 |

* cited by examiner

METHOD AND DEVICE FOR PERFORMING COMMUNICATION

CROSS-REFERENCE TO RELATED APPLICATION(S)

This application is based on and claims priority under 35 U.S.C. § 119 of a Korean patent application number 10-2018-0029279, filed on Mar. 13, 2018, in the Korean Intellectual Property Office, the disclosure of which is incorporated by reference herein in its entirety.

BACKGROUND

1. Field

The disclosure relates to a method and device for performing communication. More particularly, the disclosure relates to a method and device for continuously providing a communication service to the device while the device is moving.

2. Description of Related Art

Internet protocol (IP) session continuity means that, when a terminal is allocated an IP address for accessing a data network so as to be serviced, the terminal accesses the data network by using the same IP address wherever the terminal moves. For example, in long-term evolution (LTE), the IP session continuity of the terminal is guaranteed in all areas by using a session and service continuity (SSC) mode 1.

Service continuity means that continuity of a service is guaranteed in an application phase whereas IP session continuity is not guaranteed. For example, in a domain name system (DNS), Wi-Fi, $5^{th}$-generation (5G), or the like, the service continuity is guaranteed in the application phase by using an SSC mode 2 or an SSC mode 3.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and device for smoothly changing an existing internet protocol (IP) session to a new IP session so as to continuously provide a real-time communication service while the device is moving.

Additional aspects will be set forth in part in the description which follows and, in part, will be apparent from the description, or may be learned by practice of the presented embodiments.

In accordance with an aspect of the disclosure, a method of communicating, by a first terminal, in a wireless communication system is provided. The method includes communicating with a first gateway by using a first internet protocol (IP) address allocated to the first terminal, according to a first IP session; in response to a distance between the first terminal and a second gateway being equal to or less than a predetermined threshold, establishing a second IP session with the second gateway while the first IP session is set in the first terminal, receiving, from a second terminal, a first IP session-release message about the first IP session via the second gateway by using a second IP address according to the second IP session, when data from the first terminal is received by the second terminal according to the first IP session, and in response to the first IP session-release message being received from the second gateway, releasing the first IP session with the first gateway.

In accordance with another aspect of the disclosure, a method of communicating, by a second terminal, in a wireless communication system is provided. The method includes communicating with a first gateway by using an IP address allocated to the second terminal, according to a first IP session and when a second IP session is established by a first terminal due to a distance between the first terminal and a second gateway being equal to or less than a predetermined threshold, transmitting a first IP session-release message about the first IP session to the second gateway by using the IP address allocated to the second terminal, wherein the first IP session is released from the first terminal, based on the first IP session-release message.

In accordance with another aspect of the disclosure, a first terminal communicating in a wireless communication system is provided. The first terminal communicating includes a memory, a transceiver, and at least one processor coupled to the memory, wherein the at least one processor is configured to control the transceiver to communicate with a first gateway by using a first IP address allocated to the first terminal, according to a first IP session, in response to a distance between the first terminal and a second gateway being equal to or less than a predetermined threshold, establish a second IP session with the second gateway while the first IP session is set in the first terminal, control the transceiver to receive, from a second terminal, a first IP session-release message about the first IP session via the second gateway by using a second IP address according to the second IP session, when data from the first terminal is received by the second terminal according to the first IP session, and in response to the first IP session-release message being received from the second gateway, release the first IP session with the first gateway.

In accordance with another aspect of the disclosure, a second terminal communicating in a wireless communication system is provided. The second terminal communicating includes a memory, a transceiver, and at least one processor coupled to the memory, wherein the at least one processor is configured to control the transceiver to communicate with a first gateway by using an IP address allocated to the second terminal, according to a first IP session, and when a second IP session is established by a first terminal due to a distance between the first terminal and a second gateway being equal to or less than a predetermined threshold, control the transceiver to transmit a first IP session-release message about the first IP session to the second gateway by using the IP address allocated to the second terminal, wherein the first IP session is released from the first terminal, based on the first IP session-release message.

In accordance with another aspect of the disclosure, a non-transitory computer-readable recording medium has recorded thereon a program for executing a method of communicating with a first gateway by using a first IP address allocated to the first terminal, according to a first IP session, in response to a distance between the first terminal and a second gateway being equal to or less than a predetermined threshold, establishing a second IP session with the second gateway while the first IP session is set in the first terminal, receiving, from a second terminal, a first IP session-release message about the first IP session via the second gateway by using a second IP address according to the second IP session, when data from the first terminal is received by the second terminal according to the first IP session, and in response to the first IP session-release message being received from the second gateway, releasing the first IP session with the first gateway.

In accordance with another aspect of the disclosure, a non-transitory computer-readable recording medium has recorded thereon a program for executing a method of communicating, by a second terminal, in a wireless communication system includes communicating with a first gateway by using an IP address allocated to the second terminal, according to a first IP session and when a second IP session is established by a first terminal due to a distance between the first terminal and a second gateway being equal to or less than a predetermined threshold, transmitting a first IP session-release message about the first IP session to the second gateway by using the IP address allocated to the second terminal, wherein the first IP session is released from the first terminal, based on the first IP session-release message.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
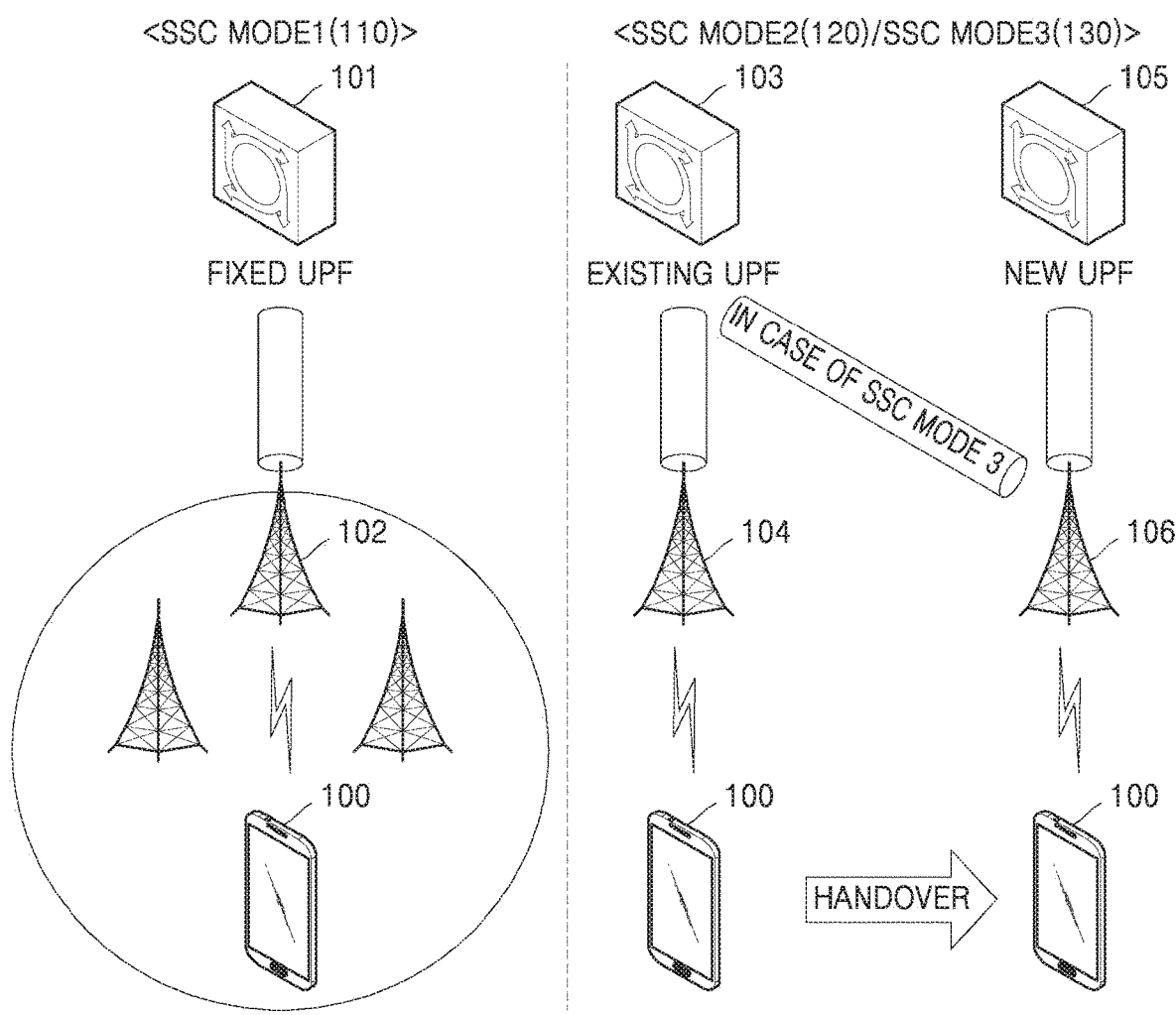
FIG. 1 is a diagram for describing a session and service continuity (SSC) mode 1, an SSC mode 2, and an SSC mode 3 according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

Terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, it will also be understood that when an element is referred to as being "connected to" or "coupled with" another element, it can be directly connected to or coupled with the other element, or it can be electrically connected to or coupled with the other element by having an intervening element interposed therebetween. Also, when a part is "connected" to another part, it means that the part is able to perform data communication by transceiving a signal with the other part.

Also, when a part "includes" or "comprises" an element, unless there is a particular description contrary thereto, the part can further include other elements, not excluding the other elements.

The accompanying drawings may be rough to describe an embodiment of the disclosure, and some dimensions may be exaggerated for clarity. Similarly, the accompanying drawings may be randomly expressed.

The term "module" used in the disclosure should be construed as including software, hardware, or a combination thereof, depending on the context in which the term is used. For example, software may be a machine language, firmware, an embedded code, and application software. As another example, hardware may be a circuit, a processor, a computer, an integrated circuit, an integrated circuit core, a sensor, a micro-electro-mechanical system (MEMS), a passive device, or a combination thereof.

Furthermore, all examples and conditional language recited herein are to be construed as being without limitation to such specifically recited examples and conditions. All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

Throughout the specification, a singular form may include plural forms, unless there is a particular description contrary thereto. Also, terms such as "comprise" or "comprising" are used to specify existence of a recited form, a number, a process, an operation, a component, and/or groups thereof, not excluding the existence of one or more other recited forms, one or more other numbers, one or more other processes, one or more other operations, one or more other components and/or groups thereof.

Embodiments of the disclosure and the accompanying drawings are used to describe various embodiments of the disclosure, and the disclosure is not limited to the described embodiments and the accompanying drawings.

Throughout the disclosure, the expression "at least one of a, b or c" indicates only a, only b, only c, both a and b, both a and c, both b and c, all of a, b, and c, or variations thereof.

In the specification, a "terminal" is an entity that performs communication and may include a user equipment (UE), a mobile station (MS), a cellular phone, a smart phone, a computer, or a multimedia system capable of performing a communication function. However, the terminal is not limited thereto.

In the specification, a "base station" is an entity that performs resource allocation on a terminal, and may include a gNode B, an eNode B, a Node B, a base station (BS), a wireless access unit, a BS controller, or a node on a network. However, the base station is not limited thereto.

Hereinafter, the disclosure will be described in detail with reference to the accompanying drawings.

FIG. 1 is a diagram for describing a session and service continuity (SSC) mode 1 110, an SSC mode 2 120, and an SSC mode 3 130 according to an embodiment of the disclosure.

The SSC mode 1 110 indicates a mode in which, when a terminal 100 establishes a session with a fixed user plane function (UPF) 101, internet protocol (IP) session continuity is provided in all areas, regardless of types of an access network or a location of the terminal 100. In a wireless communication network using long-term evolution (LTE), the fixed UPF 101 may be a P-Gateway (P-GW). The terminal 100 having established the session with the fixed UPF 101 may communicate with an external terminal via a base station 102.

The SSC mode 2 120 indicates a mode in which a session between the terminal 100 and an existing UPF 103 is maintained only in a particular area related to the existing UPF 103, and when the terminal 100 exits from the particular area related to the existing UPF 103 and enters a particular area related to a new UPF 105, a core network deletes the session between the terminal 100 and the existing UPF 103 and establishes a new session between the terminal 100 and the new UPF 105. For example, in a case where the terminal 100 moves and thus exits from the particular area related to the existing UPF 103 and then enters the particular area related to the new UPF 105, the terminal 100 establishing the session with the existing UPF 103 and communicating with the external terminal via a base station 104, the core network may delete the session between the terminal 100 and the existing UPF 103 and may newly establish a session between the terminal 100 and the new UPF 105. The terminal 100 may communicate with the external terminal via a base station 106, based on the session between the terminal 100 and the new UPF 105.

The SSC mode 3 130 indicates a mode in which the session between the terminal 100 and the existing UPF 103 is maintained only in the particular area related to the existing UPF 103, and when the terminal 100 exits from the particular area related to the existing UPF 103 and enters the particular area related to the new UPF 105, the core network first establishes a new session between the terminal 100 and the new UPF 105 and then deletes the session between the terminal 100 and the existing UPF 103. That is, in the SSC mode 3 130, there is a time period in which the session between the terminal 100 and the existing UPF 103 and the new session between the terminal 100 and the new UPF 105 are simultaneously maintained.

When real-time communication is performed between at least two terminals in the SSC mode 3, a terminal (hereinafter, referred to as 'the transmission terminal') that has transmitted data at a particular time may recognize that a terminal (hereinafter, referred to as 'the reception terminal') that has received the data changes its IP session to a new IP session and then may release the IP session (in this regard, it is obvious to one of ordinary skill in the art that the transmission terminal and the reception terminal may switch their roles according to time and thus the transmission terminal may become the reception terminal and the reception terminal may become the transmission terminal). When the transmission terminal releases the IP session, the transmission terminal and the reception terminal may communicate with each other via the new IP session.

Therefore, in order for at least two terminals to smoothly communicate in the SSC mode 3, it is required for the transmission terminal to rapidly receive information indicating that the IP session of the reception terminal has been changed to the new IP session. A terminal according to an embodiment of the disclosure which will be described at a later time performs a method of providing a mutually-smooth communication environment by transmitting, in the SSC mode 3, information including a change or an unchange (i.e., reverse change) of an IP session of the terminal to an external terminal.

Figure 2:
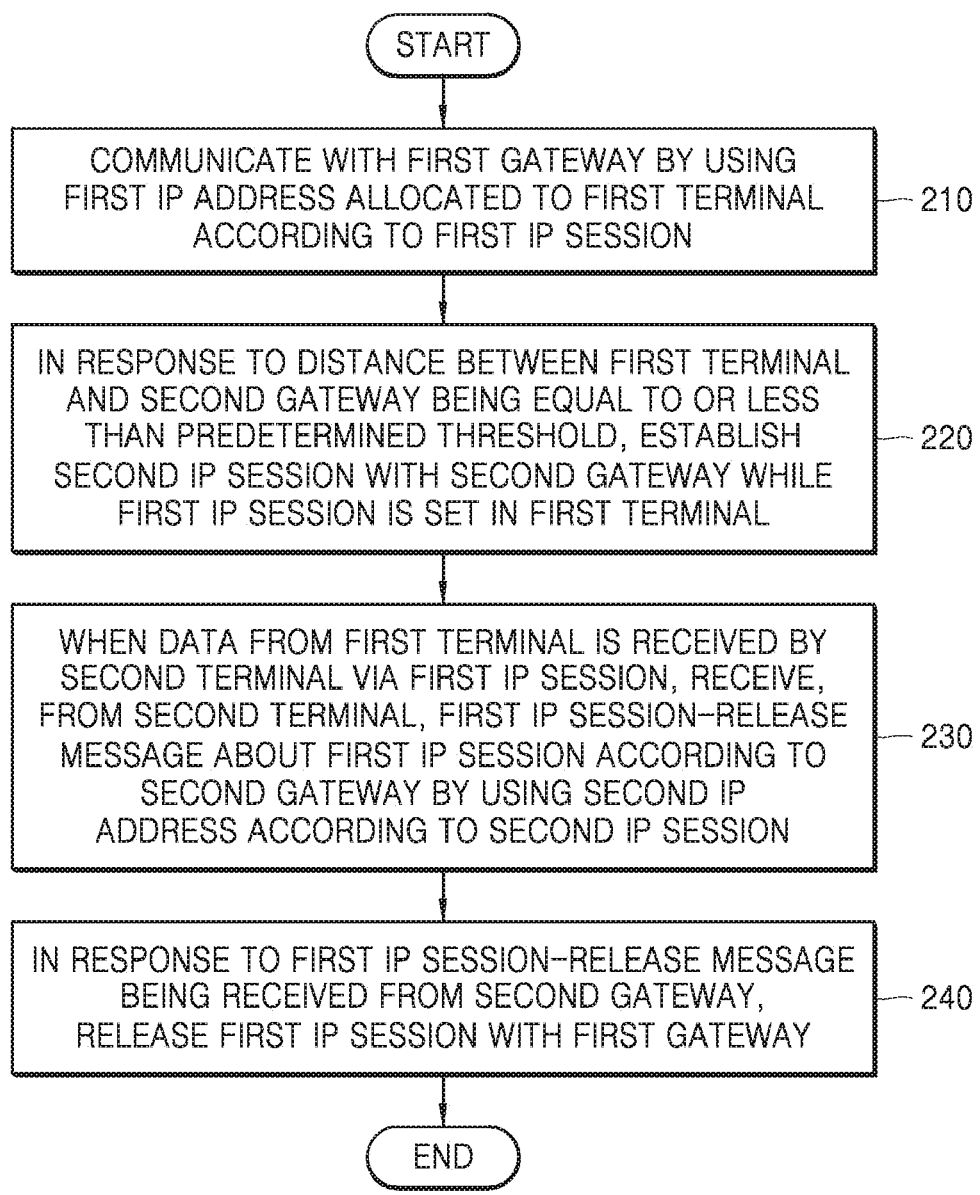
FIG. 2 is a flowchart illustrating a method of communicating with a second terminal, the method being performed by a first terminal, according to an embodiment of the disclosure.

FIG. 2 is a flowchart illustrating a method of communicating with a second terminal, the method being performed by a first terminal, according to an embodiment of the disclosure.

In the specification, the term "first terminal" may mean a terminal that has transmitted data in communication between terminals, and may correspond to the aforementioned transmission terminal. The term "second terminal" may mean a terminal that has received the data in communication between terminals, and may correspond to the aforementioned reception terminal. In this regard, it is obvious to one of ordinary skill in the art that the first terminal and the second terminal may switch their roles according to time and thus the first terminal may become the second terminal and the second terminal may become the first terminal.

The first terminal according to an embodiment of the disclosure may communicate with the second terminal in the SSC mode 3 by performing operations of the flowchart of FIG. 2.

In the specification, the term "first IP session" means an existing IP session used in a process of communication between the first terminal and the second terminal, and the term "second IP session" means a new IP session that is changed from the first IP session in the process of communication between the first terminal and the second terminal.

Also, in the specification, the term "first gateway" means a gateway that communicates with the first terminal and the second terminal according to the first IP session, and the term "second gateway" means a gateway that communicates with the first terminal and the second terminal according to the second IP session. The gateways may each include an IP anchor performing IP anchoring, a packet data network gateway (P-GW), or the like, but types of the gateways are not limited thereto.

In operation 210, the first terminal may communicate with the first gateway by using a first IP address allocated to the first terminal according to a first IP session. For example, the first terminal may exchange a signal with the first gateway by using the first IP address allocated to the first terminal according to the first IP session.

When a terminal enters a particular area, the first gateway may provide an UPF of the first gateway to the terminal. For example, when the first terminal enters a particular area near the first gateway, the first gateway may provide the UPF of the first gateway to the first terminal.

In operation 220, in response to a distance between the first terminal and the second gateway being equal to or less than a predetermined threshold, the first terminal may establish a second IP session with the second gateway while the first IP session is set in the first terminal. For example, in a case where the first terminal exits from the particular area near the first gateway and then enters a particular area near the second gateway, and thus a distance between the first terminal and the second gateway is equal to or less than the predetermined threshold, the first terminal and the second gateway may establish the second IP session while the first IP session is set in the first terminal. The predetermined threshold may vary according to gateways.

In operation 230, when data from the first terminal is received by the second terminal according to the first IP session, the first terminal may receive, from the second terminal, a first IP session-release message about the first IP session via the second gateway by using a second IP address according to the second IP session. The first terminal may recognize that the second terminal has established a new IP session with the second gateway, by receiving the first IP session-release message from the second terminal. For example, the first IP session-release message may include a data packet.

In an embodiment of the disclosure, the first IP session-release message transmitted from the second terminal to the first terminal may include information about at least one of an existing IP address of the second terminal, a new IP address of the second terminal, an existing IP address of the first terminal, a new IP address of the first terminal, or message-identification (message-ID). However, an item included in the first IP session-release message is not limited thereto.

When the second terminal uses the existing IP address even when a session is changed from the first IP session to the second IP session, the first IP session-release message may not include the new IP address of the second terminal. When the second terminal uses the new IP address because the session is changed from the first IP session to the second IP session, the first IP session-release message may not include the new IP address of the second terminal.

The message-ID may include information indicating whether the second terminal has established the new IP session with the second gateway. For example, ID 0001 may indicate that the second terminal has established the new IP session with the second gateway.

In operation 240, in response to the first IP session-release message being received from the second gateway, the first terminal may release the first IP session with the first gateway. The first terminal may recognize whether the second terminal has established the new IP session with the second gateway, based on the first IP session-release message received from the second terminal, and right after the first terminal recognizes that the second terminal has established the new IP session with the second gateway, the first terminal may release the first IP session with the first gateway.

Compared to a terminal that releases an existing IP session by using a separate session release timer without receiving the first IP session-release message from the second terminal, the first terminal and the second terminal of the disclosure may smoothly perform a switch from the existing IP session to the new IP session when the first terminal and the second terminal communicate with each other in the SSC mode 3.

Figure 3:
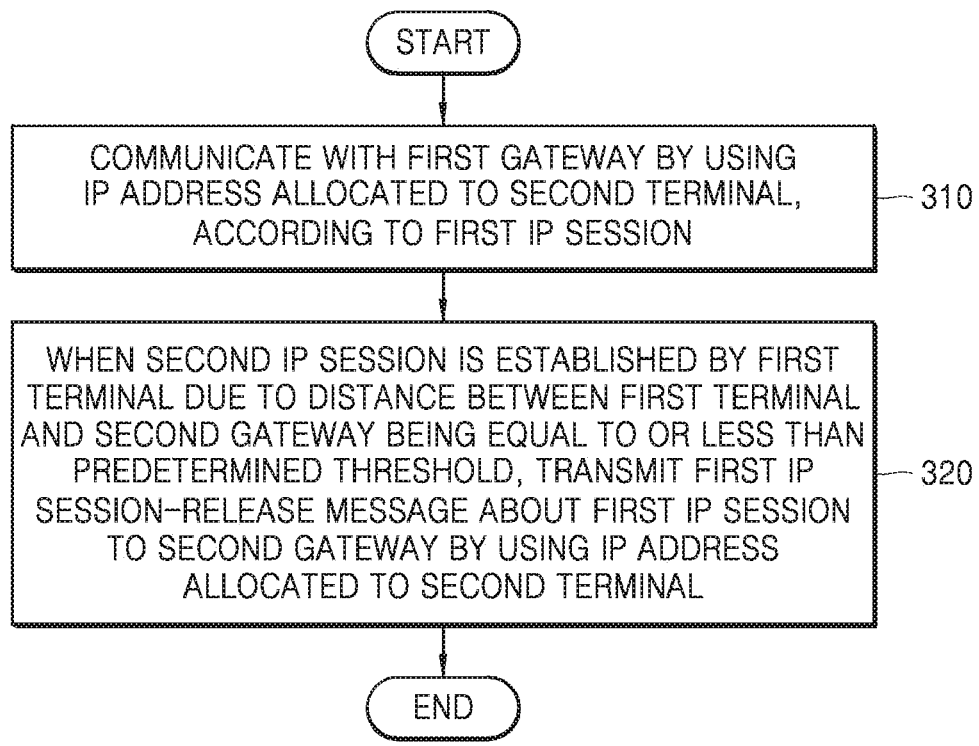
FIG. 3 is a flowchart illustrating a method of communicating with a second terminal, the method being performed by a first terminal, according to an embodiment of the disclosure.

FIG. 3 is a flowchart illustrating a method of communicating with a second terminal, the method being performed by a first terminal, according to an embodiment of the disclosure.

In descriptions with reference FIG. 3, overlapping descriptions with respect to FIG. 2 are omitted or briefly described.

The second terminal according to an embodiment of the disclosure may communicate with the first terminal in the SSC mode 3 by performing operations shown in the flowchart of FIG. 3.

In operation 310, the second terminal may communicate with the first gateway by using an IP address allocated to the second terminal, according to a first IP session. For example, according to the first IP session, the second terminal may transceive a signal from/to the first gateway by using the IP address allocated to the second terminal.

In operation 320, when a second IP session is established by the first terminal due to a distance between the first terminal and the second gateway being equal to or less than a predetermined threshold, the second terminal may transmit a first IP session-release message about the first IP session to the second gateway by using the IP address allocated to the second terminal. For example, in a case where the first terminal enters a particular area near the second gateway, and thus the distance between the first terminal and the second gateway is equal to or less than the predetermined threshold and then the second IP session is established between the first terminal and the second gateway, the second terminal may transmit the first IP session-release message to the second gateway, according to the established second IP session.

The first IP session may be released from the first terminal, based on the first IP session-release message.

Figure 4:
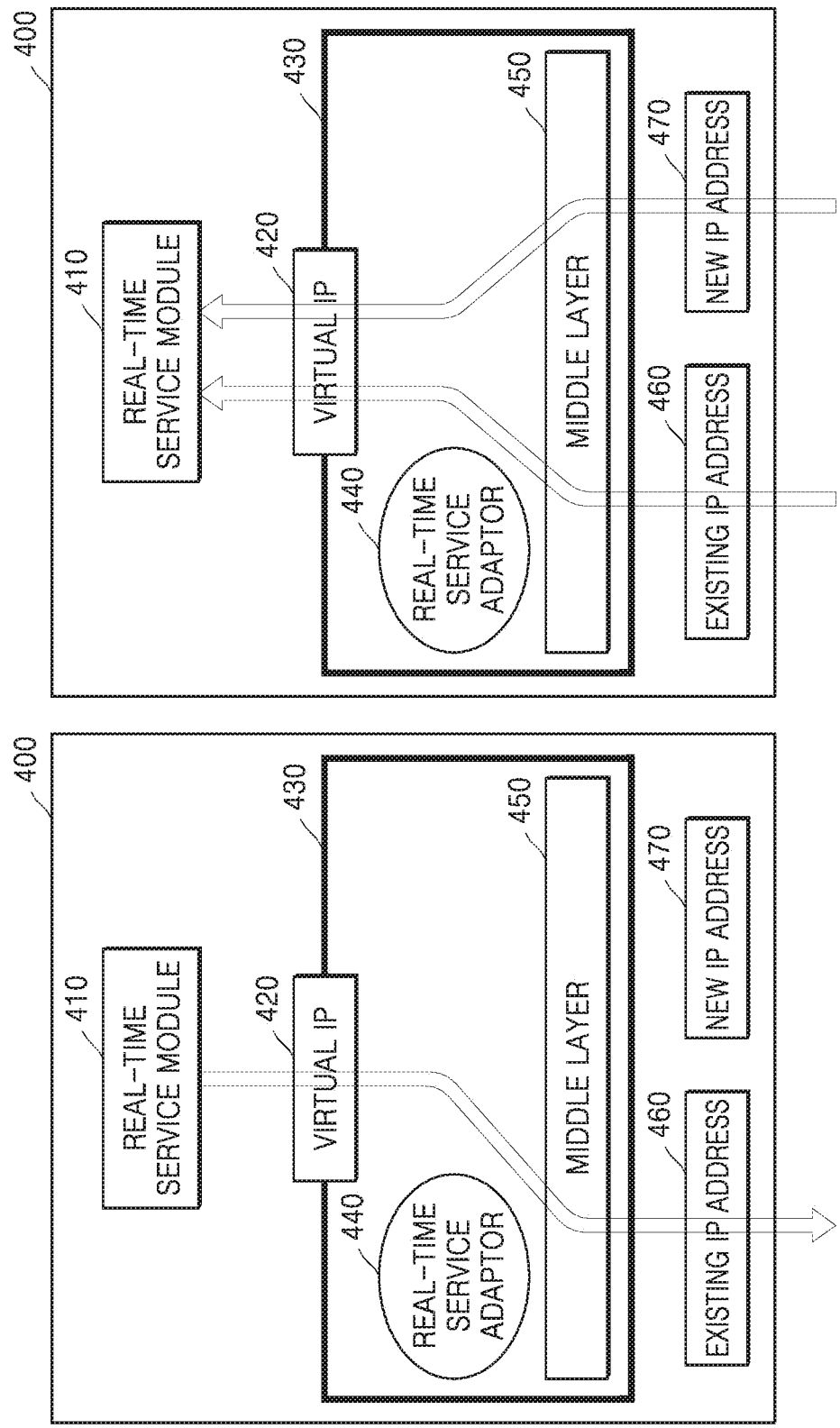
FIG. 4 illustrates a process of communicating, by a terminal, with an external terminal, according to an embodiment of the disclosure.

FIG. 4 illustrates a process of communicating, by a terminal 400, with an external terminal, according to an embodiment of the disclosure.

The terminal 400 according to an embodiment may include a real-time service module 410 and a real-time application framework 430. The real-time application framework 430 may include a real-time service adaptor 440 and a middle layer 450.

The middle layer 450 included in the real-time application framework 430 may provide a bridge function between a virtual IP address 420 and existing and new IP addresses 460 and 470. In the terminal 400, a signal transmitted from the real-time service module 410 by using the virtual IP address 420 may be transferred to the middle layer 450. The signal may be transmitted from the middle layer 450 to the external terminal via a gateway by using the existing IP address 460.

Also, the terminal 400 may receive a signal from the external terminal. The middle layer 450 may receive the signal transmitted from the external terminal, by using the existing IP address 460 or the new IP address 470. For example, when a new IP session is established between the terminal 400 and the external terminal, the middle layer 450 may receive the signal transmitted from the external terminal, by using the existing IP address 460 or the new IP address 470. The signal received by the middle layer 450 may be transferred to the real-time service module 410 by using the virtual IP address 420.

The real-time service adaptor 440 according to an embodiment of the disclosure may determine whether a new IP session has been established, may determine whether to perform IP switch over at an application level, and may transmit an instruction for releasing an existing session to a host modem device driver. The host modem device driver may include, but is not limited to, an LTE modem, a $5^{th}$-generation (5G) modem, a cable modem, a WiFi modem, a lower layer 2, or the like.

Also, the real-time service adaptor 440 may perform snooping on a registration message or a resolution message which is transceived between a real-time name server and adaptor software of the terminal 400.

Figure 5:
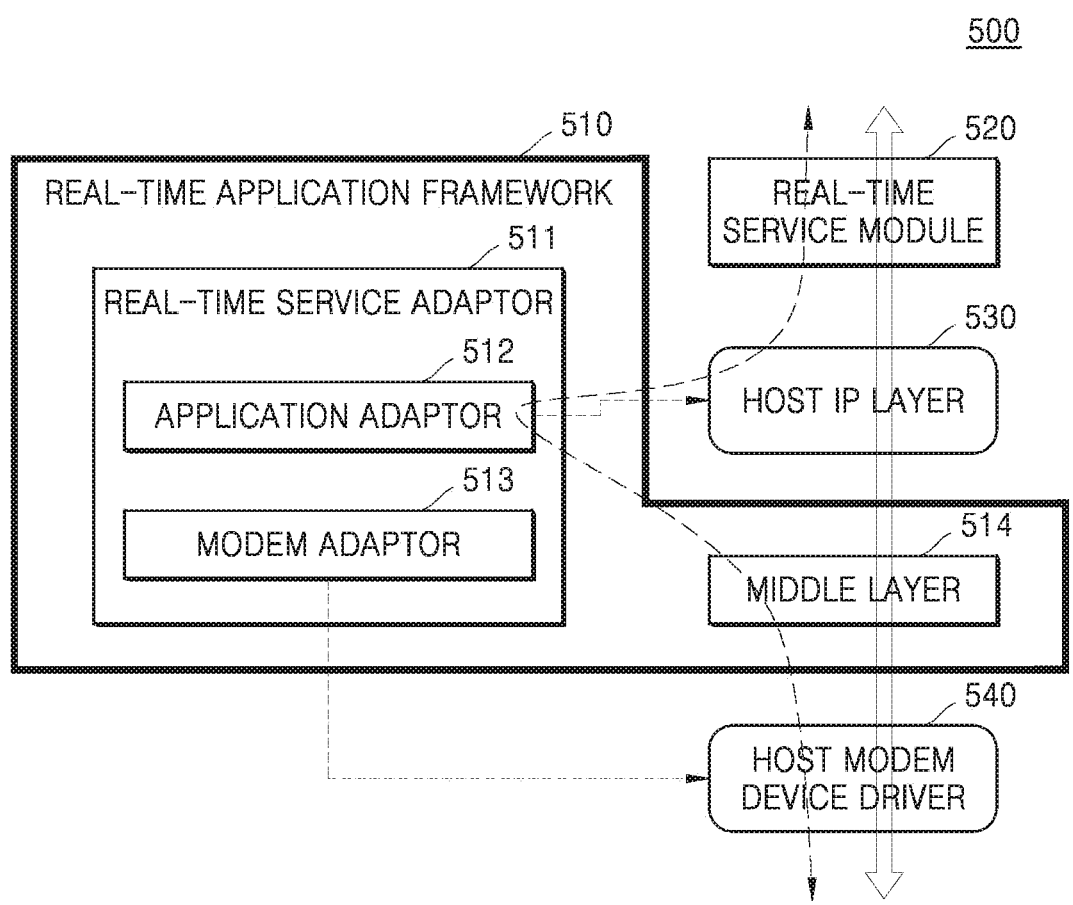
FIG. 5 is a diagram illustrating a process of communicating, by a terminal, with an external terminal, according to another embodiment of the disclosure.

FIG. 5 is a diagram illustrating a process of communicating, by a terminal 500, with an external terminal, according to another embodiment of the disclosure.

A real-time application framework 510 according to an embodiment of the disclosure may include a real-time service adaptor 511 and a middle layer 514. The real-time service adaptor 511 may include an application adaptor 512 and a modem adaptor 513.

A real-time service module 520 according to an embodiment of the disclosure and a host modem device driver 540 may transceive a signal therebetween. To transceive a signal related to an application in the terminal 500, the application adaptor 512 may transmit a control command signal to a host IP layer 530, and the real-time service module 520 and the host modem device driver 540 may transceive a signal therebetween via the host IP layer 530, the application adaptor 512, and the middle layer 514.

The modem adaptor 513 according to an embodiment of the disclosure may transmit a control command signal to the host modem device driver 540. The modem adaptor 513 and the host modem device driver 540 may be related to a wireless communication system of the same kind. For example, when the modem adaptor 513 is related to a modem for 5G, the host modem device driver 540 may also be related to a modem for 5G.

Figure 6A:
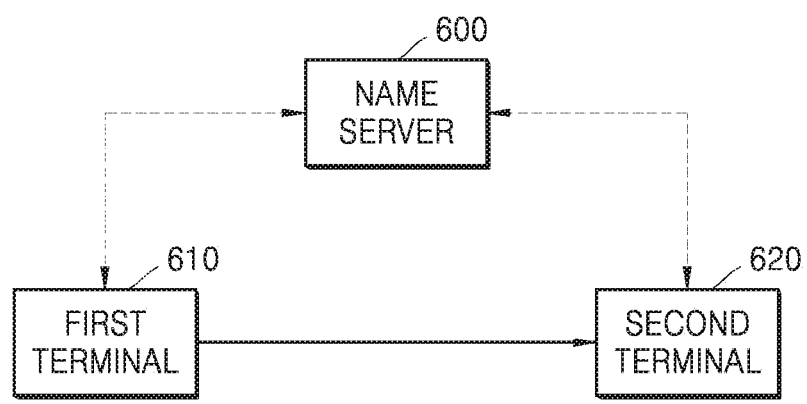
FIG. 6A is a diagram illustrating a process of communicating, by a first terminal and a second terminal, with a name server, according to an embodiment of the disclosure.
Figure 6B:
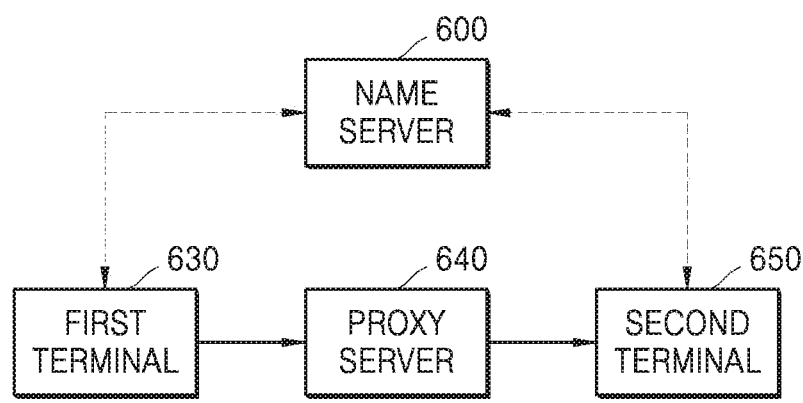
FIG. 6B is a diagram illustrating a process of communicating, by a first terminal and a second terminal, with a name server, according to an embodiment of the disclosure.

FIGS. 6A and 6B are diagrams illustrating a process of communicating, by a first terminal 610 and a second terminal 620, with a name server 600 according to an embodiment of the disclosure.

FIG. 6A is a diagram illustrating a process in which the first terminal 610 and the second terminal 620 and the name server 600 communicate with each other when the first terminal 610 according to an embodiment of the disclosure transmits a signal to the second terminal 620.

The first terminal 610 according to an embodiment of the disclosure may transmit a real-time signal to the second terminal 620 in a peer-to-peer scheme. For example, the first terminal 610 may transfer a real-time transport protocol (RTP) signal to the second terminal 620.

When an IP session is changed in a process in which the first terminal 610 transmits the real-time signal to the second terminal 620 in the peer-to-peer scheme, the first terminal 610 or the second terminal 620 may transceive a signal from/to the name server 600. For example, at least one of the first terminal 610 or the second terminal 620 may transceive at least one of registration information of a new IP address or resolution information from/to the name server 600.

The name server 600 may register the new IP address based on the registration information transceived from/to at least one of the first terminal 610 or the second terminal 620.

FIG. 6B is a diagram illustrating a process in which a first terminal 630 and a second terminal 650 and the name server 600 communicate with each other when the first terminal 630 according to an embodiment of the disclosure transmits a signal to the second terminal 650 via a proxy server 640.

The first terminal 630 according to an embodiment of the disclosure may transmit a real-time signal to the second terminal 650 in a proxy-mode scheme. For example, the first terminal 630 may transfer an RTP signal to the proxy server 640, and the proxy server 640 may transfer the RTP signal to the second terminal 650.

When an IP session is changed in a process in which the first terminal 630 transmits the real-time signal to the second terminal 650 in the proxy-mode scheme, the first terminal 630 or the second terminal 650 may transceive a signal from/to the name server 600. For example, at least one of the first terminal 630 or the second terminal 650 may transceive at least one of registration information of a new IP address or resolution information from/to the name server 600.

The name server 600 may register the new IP address based on the registration information transceived from/to at least one of the first terminal 630 or the second terminal 650.

Figure 7:
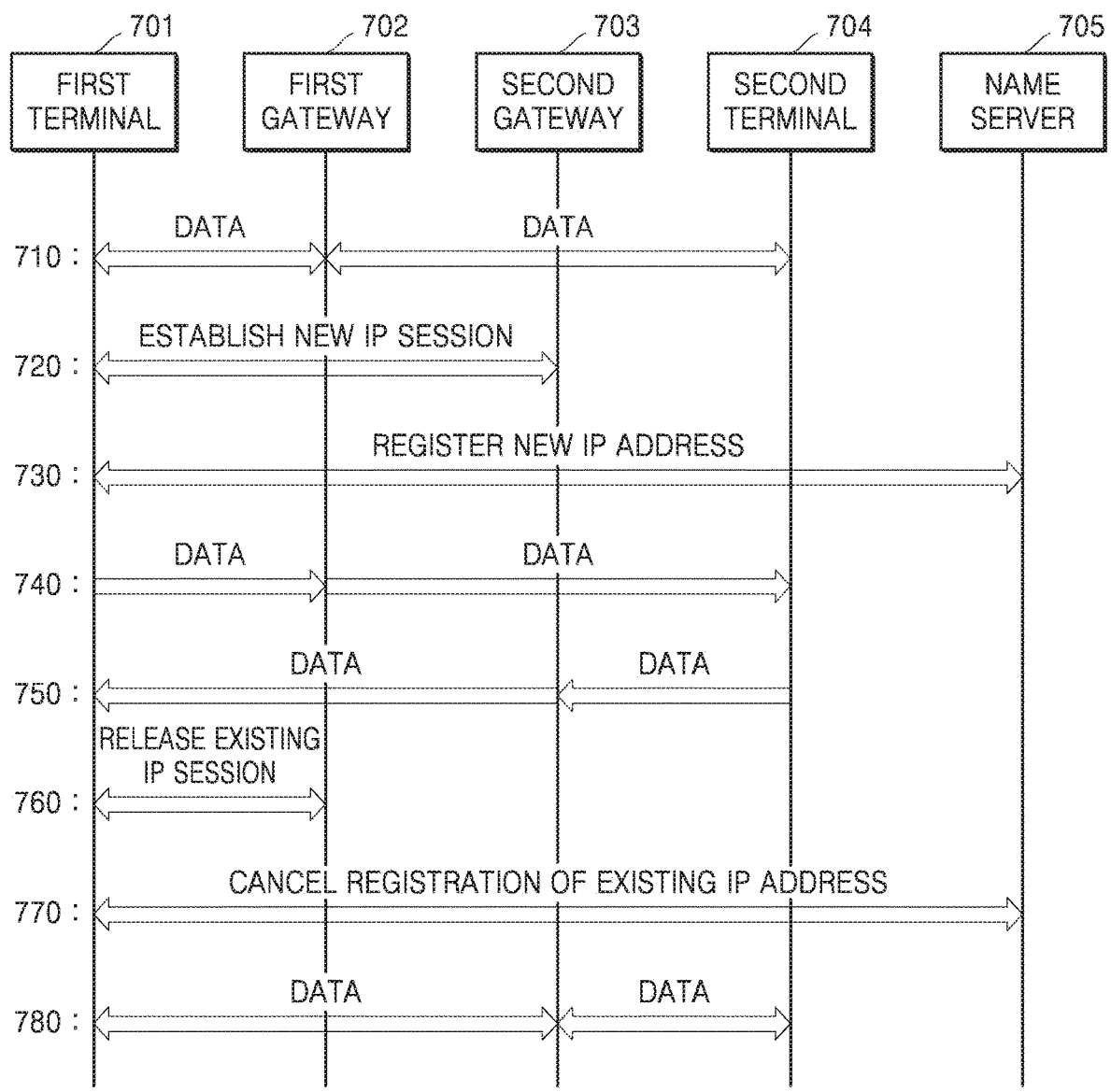
FIG. 7 is a diagram illustrating a process in which a first terminal, a second terminal, a first gateway, a second gateway, and a name server transceive a signal therebetween, according to an embodiment of the disclosure.

FIG. 7 is a diagram illustrating a process in which a first terminal 701, a second terminal 704, a first gateway 702, a second gateway 703, and a name server 705 transceive a signal therebetween, according to an embodiment of the disclosure.

Referring to FIG. 7, overlapping descriptions with respect to FIGS. 2 to 5, 6A, and 6B are omitted or briefly described.

In operation 710, the first gateway 702 may transceive a signal from/to the first terminal 701 and the second terminal 704. In detail, the first gateway 702 may transceive the signal from/to the first terminal 701 and the second terminal 704 according to a first IP session. The signal transceived between the first terminal 701 and the second terminal 704 may include data, an RTP signal, or the like.

The first terminal 701 according to an embodiment of the disclosure may communicate with the first gateway 702 by using a first IP address allocated to the first terminal 701 according to a first IP session. The second terminal 704 may communicate with the first gateway 702 by using an IP address allocated to the first terminal 701 according to the first IP session.

In operation 720, the first terminal 701 and the second gateway 703 may establish a new IP session. In detail, in response to a distance between the first terminal 701 and the second gateway 703 being equal to or less than a predetermined threshold, the first terminal 701 may establish a second IP session with the second gateway 703.

In operation 730, the first terminal 701 may register a new IP address with the name server 705. In detail, when an IP address of the first terminal 701 is changed from the first IP address to the second IP address because a session is changed from the first IP session to the second IP session, the first terminal 701 may transceive information about registration of the second IP address from/to the name server 705 and thus may register the second IP address with the name server 705.

In operation 740, the first terminal 701 may transmit a signal to the second terminal 704 via the first gateway 702 according to an existing IP session. In detail, the first terminal 701 may transmit data to the second terminal 704 via the first gateway 702 by using the first IP address according to the first IP session.

The first terminal 701 may transmit, to the second terminal 704, information indicating that the second IP address that is the new IP address has been added to the first terminal 701. The second terminal 704 may recognize that the second IP address has been added to the first terminal 701, based on the information received from the first terminal 701, the information indicating that the second IP address has been added to the first terminal 701.

In operation 750, the second terminal 704 may transmit a signal to the first terminal 701 via the second gateway 703 according to the new IP session. In detail, the second terminal 704 may transmit data to the first terminal 701 via the second gateway 703 according to the new IP session. The first terminal 701 may receive the data of the second terminal 704 from the second gateway 703 by using the second IP address according to the second IP session. The data transmitted from the second terminal 704 to the first terminal 701 may include a first IP session-release message about the first IP session. The first IP session-release message may include, but is not limited to, a data packet.

In an embodiment of the disclosure, the first IP session-release message transmitted from the second terminal 704 to the first terminal 701 may include information about at least one of an existing IP address of the second terminal 704, the new IP address of the second terminal 704, an existing IP address of the first terminal 701, the new IP address of the first terminal 701, or message-ID. However, an item included in the first IP session-release message is not limited thereto.

The second terminal 704 according to an embodiment of the disclosure may transmit, to the first terminal 701, information about deletion of the existing IP address. For example, the second terminal 704 may transmit, to the first terminal 701, command information commanding deletion of the existing IP address. The first terminal 701 may delete the first IP address, based on the information received from the second terminal 704.

In operation 760, the first terminal 701 may release the existing IP session with the first gateway 702. In detail, in response to the first IP session-release message being received from the second gateway 703, the first terminal 701 may release the first IP session with the first gateway 702. The first IP session-release message may include a data packet.

In operation 770, the first terminal 701 may cancel registration of the existing IP address by communicating with the name server 705. For example, the first terminal 701 may cancel registration of the first IP address from the name server 705 by transmitting, to the name server 705, information requesting to cancel registration of the first IP address.

In operation 780, the first terminal 701 and the second terminal 704 may communicate according to the new IP session. In detail, the first terminal 701 and the second terminal 704 may communicate with each other via the second gateway 703 according to the new IP session.

Figure 8:
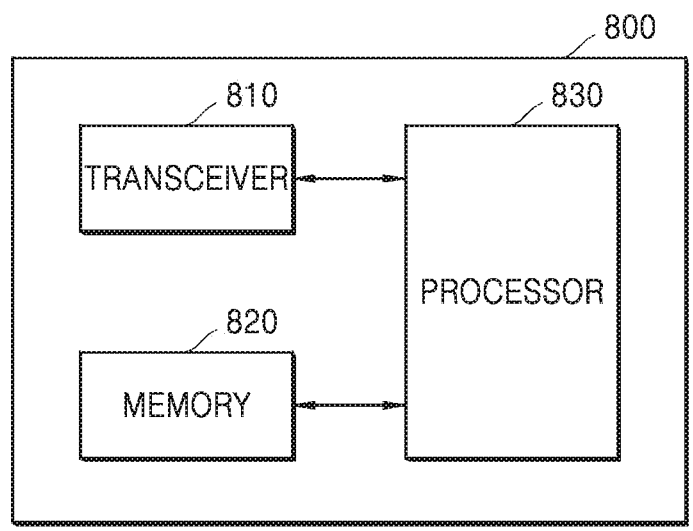
FIG. 8 is a block diagram illustrating configurations of a first terminal according to an embodiment of the disclosure.

FIG. 8 is a block diagram illustrating configurations of a first terminal according to an embodiment of the disclosure.

Elements of a first terminal 800 and a second terminal 900 shown in FIGS. 8 and 9 may perform operations of terminals described with reference to FIGS. 1 to 5, 6A, 6B, and 7, and overlapping descriptions with respect to FIGS. 1 to 5, 6A, 6B, and 7 are not provided.

Referring to FIG. 8, the first terminal 800 according to an embodiment of the disclosure may include a transceiver 810, a memory 820, and a processor 830. However, not all elements shown in FIG. 8 are necessary elements of the first terminal 800. The first terminal 800 may be embodied with more or less elements than the elements shown in FIG. 8. In addition, the transceiver 810, the memory 820, and the processor 830 may be implemented as one chip in the first terminal 800 according to an embodiment of the disclosure.

The first terminal 800 according to an embodiment of the disclosure may transceive a signal with a base station. Also, the first terminal 800 may transceive the signal with the second terminal 900 via the base station. Here, the signal may include control information or data. The transceiver 810 according to an embodiment of the disclosure may include a radio frequency (RF) unit, and the RF unit may include an RF transmitter and an RF receiver.

The processor 830 according to an embodiment of the disclosure may control all operations of the first terminal 800. For example, the processor 830 may perform functions or operations of the terminals shown in FIGS. 1 to 5, 6A, 6B, and 7. Also, the processor 830 may generally control elements such as the transceiver 810, the memory 820, or the like which are included in the first terminal 800.

The processor 830 according to an embodiment of the disclosure may control the transceiver 810 to communicate with a first gateway by using a first IP address allocated to the first terminal 800, according to a first IP session.

In response to a distance between the first terminal 800 and a second gateway being equal to or less than a predetermined threshold, the processor 830 according to an embodiment of the disclosure may establish a second IP session with the second gateway while the first IP session is set in the first terminal 800.

When data from the first terminal 800 is received by the second terminal 900 according to the first IP session, the processor 830 according to an embodiment of the disclosure may control the transceiver 810 to receive a first IP session-release message about the first IP session from the second terminal 900 via the second gateway by using a second IP address according to the second IP session.

In response to the transceiver 810 receiving the first IP session-release message from the second gateway, the processor 830 according to an embodiment of the disclosure may release the first IP session with the first gateway.

The memory 820 according to an embodiment of the disclosure may store at least one program to process and control the processor 830, and may store a signal input to or output from the first terminal 800.

Figure 9:
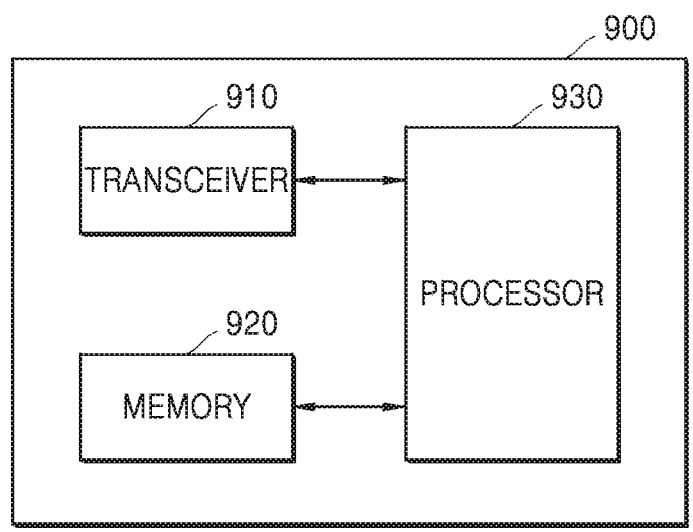
FIG. 9 is a block diagram illustrating configurations of a first terminal according to an embodiment of the disclosure.

FIG. 9 is a block diagram illustrating configurations of a first terminal according to an embodiment of the disclosure.

In an embodiment of the disclosure, the processor 830 may communicate with the second terminal 900 by executing the at least one program stored in the memory 820.

Referring to FIG. 9, the second terminal 900 according to an embodiment of the disclosure may include a transceiver 910, a memory 920, and a processor 930. However, not all elements shown in FIG. 9 are necessary elements of the second terminal 900. The second terminal 900 may be embodied with more or less elements than the elements shown in FIG. 9. In addition, the transceiver 910, the memory 920, and the processor 930 may be implemented as one chip in the second terminal 900 according to an embodiment of the disclosure.

The second terminal 900 according to an embodiment of the disclosure may transceive a signal with a base station. Also, the second terminal 900 may transceive the signal with the first terminal 800 via the base station. Here, the signal may include control information or data. The transceiver 910 according to an embodiment of the disclosure may include an RF unit, and the RF unit may include an RF transmitter and an RF receiver.

The processor 930 according to an embodiment of the disclosure may control all operations of the second terminal 900. For example, the processor 930 may perform functions or operations of the terminals shown in FIGS. 1 to 5, 6A, 6B, and 7. Also, the processor 930 may generally control elements such as the transceiver 910, the memory 920, or the like which are included in the second terminal 900.

The processor 930 according to an embodiment of the disclosure may control the transceiver 910 to communicate with a first gateway by using an IP address allocated to the second terminal 900, according to a first IP session.

In response to a distance between the first terminal 800 and a second gateway being equal to or less than a predetermined threshold and thus a second IP session is established, the processor 930 according to an embodiment of the disclosure may control the transceiver 910 to transmit a first IP session-release message about the first IP session to the second gateway by using the IP address allocated to the second terminal 900.

In the disclosure, a change in the IP address of the second terminal 900, the change occurring due to a switch from an existing IP session to a new IP session, is not described, but it is obvious to one of ordinary skill in the art that the IP address of the second terminal 900 may be changed because an IP session is switched from the existing IP session to the new IP session.

Also, the disclosure only includes a case in which an IP session is changed because a transmission terminal moves, but it is obvious to one of ordinary skill in the art that, even when a reception terminal moves, the IP session may be changed in correspondence with the case in which the transmission terminal moves.

The memory 920 according to an embodiment of the disclosure may store at least one program to process and control the processor 930, and may store a signal input to or output from the second terminal 900.

In an embodiment of the disclosure, the processor 930 may communicate with the first terminal 800 by executing the at least one program stored in the memory 920.

It is obvious to one of ordinary skill in the art that the disclosure may be easily embodied in many different forms without changing the technical concept or essential features of the disclosure. Thus, it should be understood that the described embodiments of the disclosure should be considered in a descriptive sense only and not for purposes of limitation. For example, configuring elements that are singular forms may be executed in a distributed fashion, and also, configuring elements that are distributed may be combined and then executed.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of communicating, by a first terminal, in a wireless communication system, the method comprising:
communicating with a first gateway by using a first internet protocol (IP) address allocated to the first terminal, according to a first IP session;
in response to a distance between the first terminal and a second gateway being equal to or less than a predetermined threshold, establishing a second IP session with the second gateway while the first IP session is set in the first terminal;
receiving, from a second terminal, a first IP session-release message about the first IP session via the second gateway by using a second IP address according to the second IP session for changing the first IP session to the second IP session, when data from the first terminal is received by the second terminal according to the first IP session;
in response to the first IP session-release message being received from the second gateway, releasing the first IP session with the first gateway; and
registering the second IP address with a name server by transmitting, to the name server, registration information of the second IP address obtained when the second IP session is established,
wherein the first IP session-release message comprises information about the first IP address, the second IP address, an IP address allocated to the second terminal, and message-identification.

2. The method of claim 1, further comprising:
requesting a name server to cancel registration of the first IP address in the name server.

3. A non-transitory computer-readable recording medium having an executable program recorded thereon, wherein the program, when executed by at least one processor, instructs a computer to perform the method of claim 1.

4. A method of communicating, by a second terminal, in a wireless communication system, the method comprising:
communicating with a first gateway by using an internet protocol (IP) address allocated to the second terminal, according to a first IP session; and
when a second IP session is established by a first terminal due to a distance between the first terminal and a second gateway being equal to or less than a predetermined threshold, transmitting a first IP session-release message about the first IP session to the second gateway by using the IP address allocated to the second terminal for changing the first IP session to the second IP session,
wherein the first IP session is released from the first terminal, based on the first IP session-release message,
wherein a second IP address is registered with a name server by transmitting, by the first terminal to the name server, registration information of the second IP address obtained when the second IP session is established, and
wherein the first IP session-release message comprises information about a first IP address, the second IP address, the IP address allocated to the second terminal, and message-identification.

5. The method of claim 4, wherein the transmitting of the first IP session-release message comprises transmitting the first IP session-release message to the first terminal via the second gateway.

6. A non-transitory computer-readable recording medium having an executable program recorded thereon, wherein the program, when executed by at least one processor, instructs a computer to perform the method of claim 4.

7. A first terminal communicating in a wireless communication system, the first terminal comprising:

a memory;
a transceiver; and
at least one processor coupled to the memory,
wherein the at least one processor is configured to:
- control the transceiver to communicate with a first gateway by using a first internet protocol (IP) address allocated to the first terminal, according to a first IP session,
- in response to a distance between the first terminal and a second gateway being equal to or less than a predetermined threshold, establish a second IP session with the second gateway while the first IP session is set in the first terminal,
- control the transceiver to receive, from a second terminal, a first IP session-release message about the first IP session via the second gateway by using a second IP address according to the second IP session, when data from the first terminal is received by the second terminal according to the first IP session for changing the first IP session to the second IP session,
- in response to the first IP session-release message being received from the second gateway, release the first IP session with the first gateway, and
- register the second IP address with a name server by controlling the transceiver to transmit, to the name server, registration information of the second IP address obtained when the second IP session is established, and
- wherein the first IP session-release message comprises information about the first IP address, the second IP address, an IP address allocated to the second terminal, and message-identification.

8. The first terminal of claim 7, wherein the at least one processor is further configured to request, by communication via the transceiver, a name server to cancel registration of the first IP address in the name server.

9. A second terminal communicating in a wireless communication system, the second terminal comprising:
a memory;
a transceiver; and
at least one processor coupled to the memory,
wherein the at least one processor is configured to:
- control the transceiver to communicate with a first gateway by using an internet protocol (IP) address allocated to the second terminal, according to a first IP session, and
- when a second IP session is established by a first terminal due to a distance between the first terminal and a second gateway being equal to or less than a predetermined threshold, control the transceiver to transmit a first IP session-release message about the first IP session to the second gateway by using the IP address allocated to the second terminal for changing the first IP session to the second IP session,
- wherein the first IP session is released from the first terminal, based on the first IP session-release message,
- wherein a second IP address is registered with a name server by transmitting, by the first terminal to the name server, registration information of the second IP address obtained when the second IP session is established, and
- wherein the first IP session-release message comprises information about a first IP address, the second IP address, the IP address allocated to the second terminal, and message-identification.

10. The second terminal of claim 9, wherein the at least one processor is further configured to control the transceiver to transmit the first IP session-release message to the first terminal via the second gateway.

* * * * *